Dec. 24, 1940.                H. R. SMITH                    2,225,802
                              DELIVERY CAR
                           Filed May 4, 1939              3 Sheets-Sheet 1
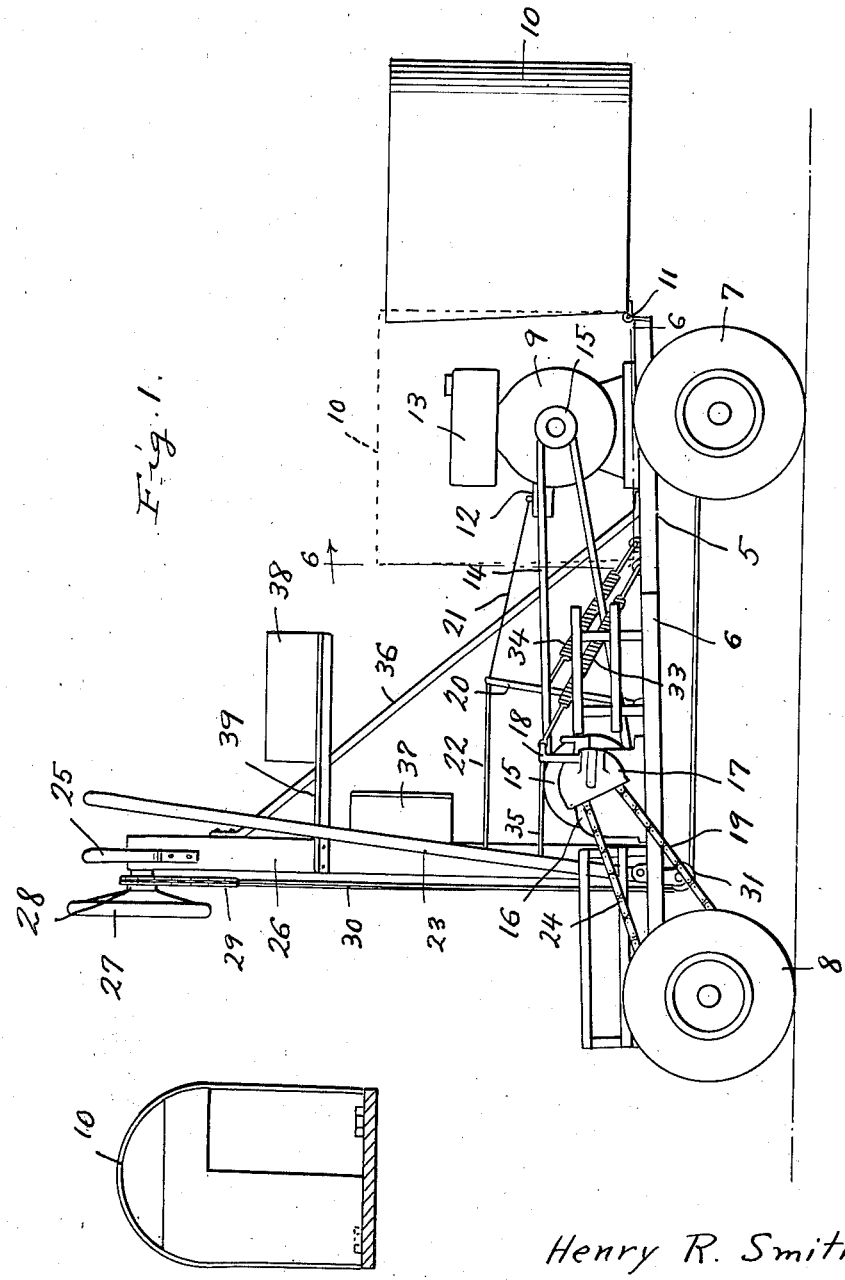
Inventor
Henry R. Smith
By Clarence A. O'Brien
and Hyman Berman
Attorneys

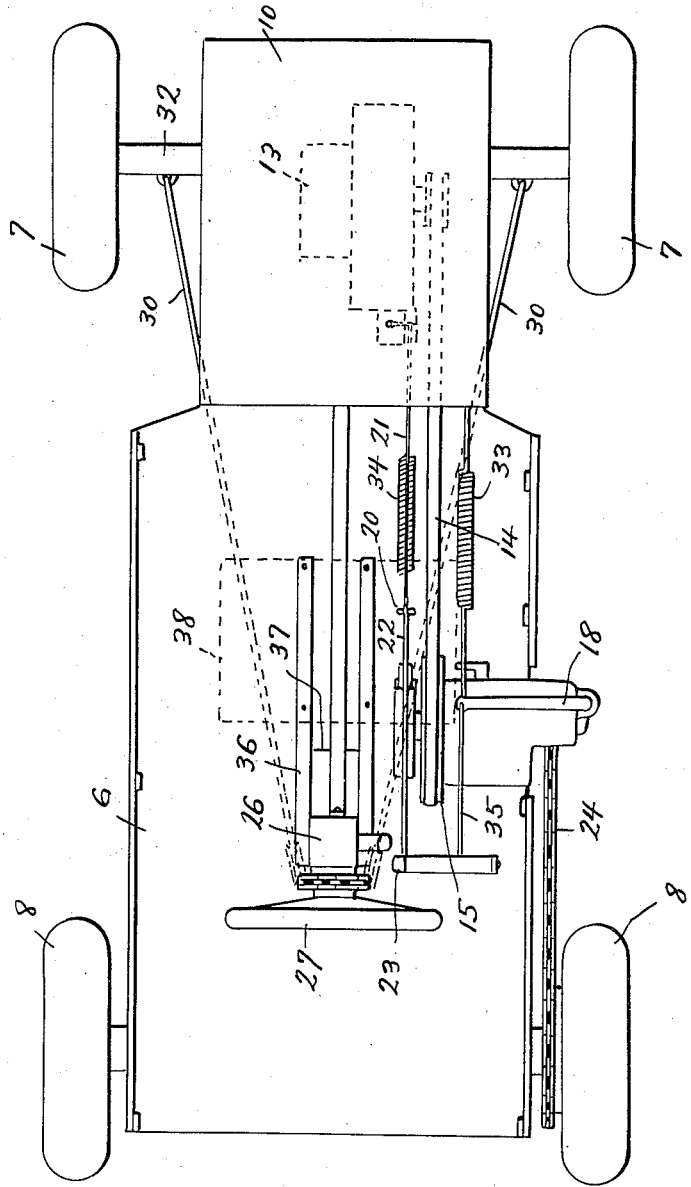

Dec. 24, 1940.   H. R. SMITH   2,225,802
DELIVERY CAR
Filed May 4, 1939   3 Sheets-Sheet 3
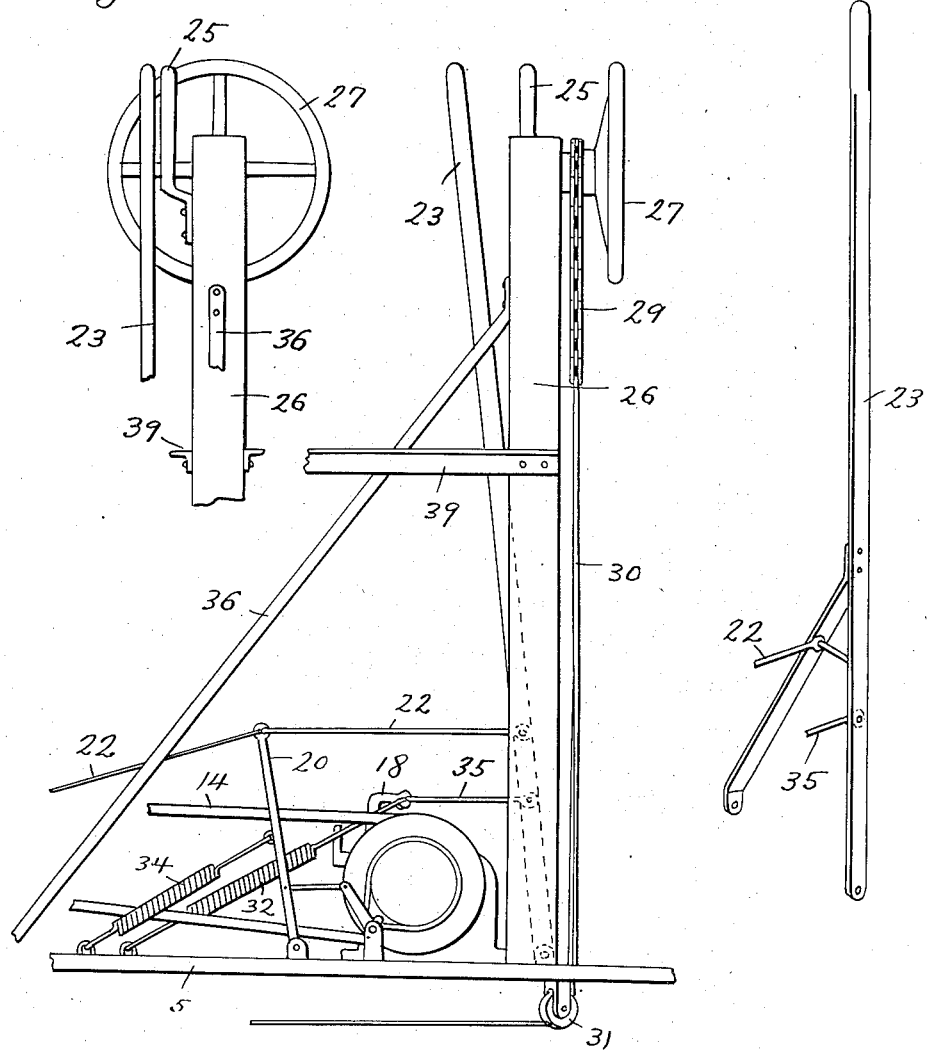
Inventor
Henry R. Smith Patented Dec. 24, 1940

2,225,802

UNITED STATES PATENT OFFICE 2,225,802

DELIVERY CAR

Henry R. Smith, Columbia, S. C.

Application May 4, 1939, Serial No. 271,777

1 Claim. (Cl. 192—.01)

This invention appertains to new and useful improvements in delivery vehicles, and more particularly to a small vehicle whereby quick deliveries can be made.

An important object of the invention is to provide a small delivery vehicle which includes a platform upon which the driver can stand and both conveniently steer and control the vehicle.

Another important object of the invention is to provide a small delivery vehicle which involves a minimum of machinery and which will be of low cost to manufacture and operate.

These and other objects and advantages of the invention will become apparent to the reader of the following specification.

In the drawings:

Figure 1 represents a side elevational view.

Figure 2 is a top plan view.

Figure 3 is a fragmentary side elevational view looking at the opposite side from that shown in Figure 1.

Figure 4 is a perspective view of the control bar.

Figure 5 is a fragmentary front elevational view of the steering post.

Figure 6 is a sectional view showing the hood taken on the line 6—6 of Figure 1.

Referring to the drawings wherein like numerals designate like parts, it can be seen that the vehicle includes the chassis frame 5 upon which is suitably mounted the sheet metal flooring or platform 6. The chassis is supported by the steerable front wheels 7 and the rear wheels 8.

Numeral 9 denotes a small internal combustion engine mounted on the forward portion of the chassis frame 5 and this is provided with the swingable hood 10, this hood being hingedly secured as at 11 to the forward end of the frame, so that it can be swung to a forward position as shown in Figure 1 to permit access to the motor.

The motor 9 has the throttle 12. A fuel tank 13 is mounted in elevated position adjacent the engine 9. A drive belt 14 operated by the pulley 15 of the engine 9 drives the drum 15 and through the transmission 16 from the drum 15 and through the clutch means 17 controlled by the swingable arm 18, power is transmitted to the drive chain 19 which extends to the rear wheels 8.

Numeral 20 denotes the brake lever which is adapted to operate the brake bracket (not shown). A cable 21 extends from the throttle 12 to the upper end of the brake lever 20 and another cable 22 extends from the upper end of the brake lever 20 to the hand bar 23 which is pivotally secured to the chassis frame 5 as at 24. The bar 23 extends upwardly and terminates at its upper end adjacent the upper end of the handle 25 which extends upwardly from the upper portion of the post 26.

Journalled into the upper portion of the post 26 is the stub shaft of the steering wheel 27 which carries the sprocket wheel 28 over which the sprocket chain 29 is trained.

Cables 30 extend downwardly from the ends of the sprocket chain 29 and pass under pulleys 31 to extend forwardly to the front axle 32, as shown in Figure 2. Obviously, by operating the steering wheel 27, the vehicle can be conveniently steered.

A coiled tension spring 33 holds the clutch lever 18 with the clutch normally in disengaged position, while the spring 34 engaged with the brake lever 20 serves to maintain the brake lever 20 in brake applied position and the throttle 12 in decelerated position.

It can now be seen that with the operator standing on the rear of the platform 6, to start the vehicle all that he has to do is to pull rearwardly on the handle bar 23. This will release the brake by pulling backwardly on the brake lever 20 and simultaneously move the clutch lever 18, due to the rod connection 35 between the hand bar 23 and the clutch lever 18, to clutch engaged position. Concurrently with the actuation of the brake lever 20 the throttle 12 will be actuated to open position from a normally idling speed position. The vehicle is now in transit at what may be regarded as regulated speed and the hand bar 23 which controls all of these functions can be conveniently held in operative position by disposing the controlling hand around both the upper portion of the hand bar 23 and the handle 25.

Suitable brace means 36 is provided for the post 26. A tool box 37 is supported by the post 26 and a basket or tray 38 is supported by bars 39 projecting forwardly from the post 26 for carrying articles such as mail or other items to be delivered.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A delivery vehicle comprising a chassis, traction and steering wheels supporting said chassis, respectively, a motor on the chassis including a throttle, a drive between the motor and traction wheels including a normally disengaged clutch, brakes for said traction wheels, normally applied, and a control common to the throttle, clutch and brakes including an upstanding hand lever pivoted on the chassis for operation in opposite directions, respectively, and operatively connected to said throttle, clutch and brakes for movement in one direction to open the throttle, engage the clutch and disengage the brakes concurrently, and a post upstanding alongside said lever and provided with a hand grip for grasping together with the lever by a hand of an operator to facilitate moving said lever and holding the same stationary after movement thereof.

HENRY R. SMITH.